US009762666B2

United States Patent
Sakai et al.

(10) Patent No.: US 9,762,666 B2
(45) Date of Patent: Sep. 12, 2017

(54) DATA SHARING DEVICE, DATA SHARING METHOD, AND COMPUTER PROGRAM PRODUCT

(71) Applicant: Kabushiki Kaisha Toshiba, Minato-ku (JP)

(72) Inventors: Narumichi Sakai, Fujisawa (JP); Hiroyuki Aizu, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 284 days.

(21) Appl. No.: 14/731,543

(22) Filed: Jun. 5, 2015

(65) Prior Publication Data
US 2015/0381720 A1 Dec. 31, 2015

(30) Foreign Application Priority Data

Jun. 30, 2014 (JP) ................................ 2014-135025

(51) Int. Cl.
  *G06F 15/16* (2006.01)
  *H04L 29/08* (2006.01)
  *G06F 11/16* (2006.01)
  *G06F 17/30* (2006.01)

(52) U.S. Cl.
  CPC ...... *H04L 67/1095* (2013.01); *G06F 11/1658* (2013.01); *G06F 11/1675* (2013.01); *G06F 17/30165* (2013.01); *H04L 67/02* (2013.01)

(58) Field of Classification Search
  CPC .................. G06F 11/1675; G06F 11/1658
  See application file for complete search history.

(56) References Cited

U.S. PATENT DOCUMENTS

| 9,189,537 | B2 * | 11/2015 | Rodriguez | ........ G06F 17/30613 |
| 2003/0225841 | A1 * | 12/2003 | Song | ........ H04L 51/12 709/206 |
| 2005/0257015 | A1 * | 11/2005 | Hiraiwa | ........ G06F 3/061 711/162 |

(Continued)

FOREIGN PATENT DOCUMENTS

| JP | 08-223430 | 8/1996 |
| JP | 2012-129590 | 7/2012 |

*Primary Examiner* — Hieu Hoang
(74) *Attorney, Agent, or Firm* — Oblon, McClelland, Maier & Neustadt, L.L.P.

(57) ABSTRACT

According to an embodiment, a data sharing device includes a first storage to store first information; a second storage to store second information that is a copy of the first information; a difference generator to compare, when the first information stored in the first storage is changed, the changed first information with the second information, extract a difference therebetween if any, and generate first difference information indicating the difference; a difference transmitter to transmit the first difference information to another data sharing device; a difference receiver to receive second difference information generated in another data sharing device; a difference reflector to reflect a difference indicated by the second difference information in the first information stored in the first storage, and cause the first difference generator not to generate the first difference information when the difference indicated by the second difference information is reflected.

9 Claims, 10 Drawing Sheets

(56) References Cited

U.S. PATENT DOCUMENTS

| | | | |
|---|---|---|---|
| 2009/0282458 A1* | 11/2009 | Hjelm | H04L 69/24 726/1 |
| 2009/0298581 A1* | 12/2009 | Furuhashi | G07F 17/3232 463/29 |
| 2013/0080829 A1* | 3/2013 | Colline | G06F 11/0727 714/6.22 |
| 2015/0110088 A1* | 4/2015 | Yeh | H04W 56/001 370/338 |
| 2015/0269043 A1* | 9/2015 | Wilson | G06F 11/3006 714/6.3 |

* cited by examiner

DATA SHARING DEVICE, DATA SHARING METHOD, AND COMPUTER PROGRAM PRODUCT

CROSS-REFERENCE TO RELATED APPLICATIONS

This application is based upon and claims the benefit of priority from Japanese Patent Application No. 2014-135025, filed on Jun. 30, 2014; the entire contents of which are incorporated herein by reference.

FIELD

Embodiments described herein relate generally to a data sharing device, a data sharing method, and a computer program product.

BACKGROUND

In recent years, there have been proposed data sharing systems in which, when a change is made on a displayed image by an application such as Virtual Network Computing (VNC) at any of multiple information processing devices connected via a network, a difference between images is transferred to the other information processing devices so that images displayed thereon are made to be the same.

In such a system, however, when a change is made on an image displayed on a certain information processing device and difference information of the image is transferred to the other information processing devices, a loop is caused in which displayed images at the other information processing devices are changed according to the received difference information and the other information processing devices thus further transfer difference information of the changes to the certain source information processing device. There is thus a problem that the performances of the information processing devices and the network are degraded owing to occurrence of such a loop of transfer.

DETAILED DESCRIPTION

Figure 1:
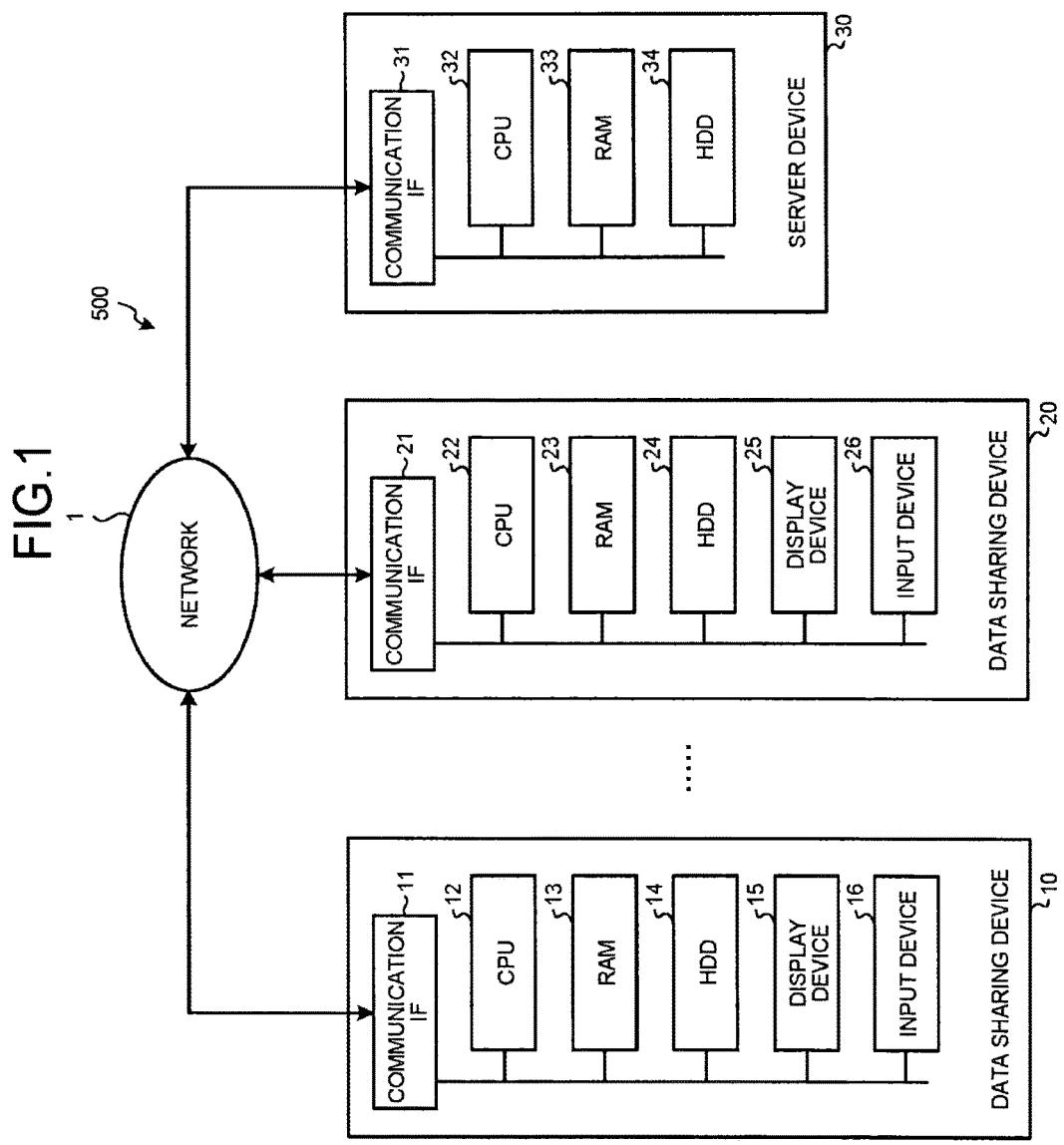
FIG. 1 is a diagram illustrating an example of an overall configuration of a data sharing system according to a first embodiment.

According to an embodiment, a data sharing device includes a first storage, a second storage, a difference generator, a difference transmitter, a difference receiver, and a difference reflector. The first storage stores first information. The second storage stores second information that is a copy of the first information stored in the first storage. When the first information stored in the first storage is changed, the difference generator compares the changed first information with the second information stored in the second storage. If there is a difference between the changed first information and the second information, the difference generator extracts the difference, and generates first difference information indicating the difference. The difference transmitter transmits the first difference information to another data sharing device. The difference receiver receives second difference information generated in another data sharing device. The difference reflector reflects a difference indicated by the second difference information in the first information stored in the first storage, and causes the first difference generator not to generate the first difference information when the difference indicated by the second difference information is reflected.

Various embodiments will be described in detail below with reference to the drawings. In the drawings mentioned below, parts that are the same are designated by the same reference numerals. Since, however, the drawings are schematic, specific thicknesses and sizes are to be determined in consideration of the following description.

First Embodiment

FIG. 1 is a diagram illustrating an example of an overall configuration of a data sharing system according to a first embodiment. With reference to FIG. 1, the overall configuration of a data sharing system 500 and hardware configurations of data sharing devices 10 and 20 will be described.

As illustrated in FIG. 1, the data sharing system 500 includes a data sharing device 10, a data sharing device 20, and a server device 30. The data sharing device 10, the data sharing device 20, and the server device 30 are connected via a network 1. The network 1 is a network based on a cable communication protocol defined by IEEE (Institute of Electrical and Electronics Engineer) 802.3 or the like, a wireless communication protocol defined by IEEE 802.11, or other protocols, and realized by communication lines such as a local area network (LAN), the Internet, or dedicated lines.

Although two data sharing devices 10 and 20 are illustrated as the data sharing devices connected via the network 1 in FIG. 1, the number of data sharing devices is not limited thereto, and three or more data sharing devices may be connected.

The data sharing device 10 is a device to transmit a page request to the server device 30, receive a page response, and transfer page information contained in the page response to other data sharing devices (the data sharing device 20 in FIG. 1). Note that a page response is response information containing a page requested by the data sharing device 10, and contains header information, and an HTML (HyperText Markup Language) file, a media file, a script, or the like that is a resource of a web page. In addition, page information refers herein to information on a web page written in a markup language such as an XTML file or an XML (Extensible Markup Language) file. The data sharing device 10 includes a communication interface 11, a central processing unit (CPU) 12, a random access memory (RAM) 13, a hard disk drive (HDD) 14, a display device 15, and an input device 16. The above units are connected via a bus in a manner capable of communicating with one another.

The communication interface 11 is an interface based on a protocol such as TCP (Transmission Control Protocol)/IP (Internet Protocol) for communication with the data sharing device 20, the server device 30, etc. via the network 1 such as a LAN. When the communication interface 11 is based on TCP/IP, for example, the communication interface 11 removes headers of TCP and IP from data received from the data sharing device 20 and the server device 30. When the communication interface 11 transmits or receives data to/from the data sharing device 20 and the server device 30, the communication interface 11 also adds or removes TCP and IP headers to/from the data. The communication interface 11 is constituted by a communication unit such as a network interface card (NIC), for example.

The CPU 12 controls overall operation of the data sharing device 10.

The RAM 13 is a device to store various programs including client applications such as a browser executed at the data sharing device 10, data used for various processes carried out at the data sharing device 10, and the like. The client applications are executed by the CPU 12 on an operating system (OS) expanded on the RAM 13.

The HDD 14 is an external storage device to accumulate and store the OS, programs, data, and the like. Note that the HDD 14 is not limited to a HDD that is an external storage device, but may be realized by a storage device such as a solid state drive (SSD), an optical disk, or a magneto-optical disk (MO), for example.

The display device 15 is a device to display various images such as pages received from the server device 30 by a browser or the like. The display device 15 is constituted by a cathode ray tube (CRT) display, a liquid crystal display, a plasma display, an organic electroluminescence (EL) display, or the like, for example.

The input device 16 is a device to which operations are input by a user for causing the CPU 12 to execute predetermined processes. The input device 16 is constituted by operation input functions such as a mouse, a keyboard, a numeric key pad, a touch pad, or a touch panel.

The data sharing device 20 is a device having the same functions as the data sharing device 10. The data sharing device 20 includes a communication interface 21, a CPU 22, a RAM 23, a HDD 24, a display device 25, and an input device 26. The above devices are connected via a bus in a manner capable of communicating with one another. The communication interface 21, the CPU 22, the RAM 23, the HDD 24, the display device 25, and the input device 26 have the same functions as those of the communication interface 11, the CPU 12, the RAM 13, the HDD 14, the display device 15, and the input device 16, respectively, of the data sharing device 10.

The server device 30 is a device that functions as a web server to transmit page responses containing page information such as web pages to the data sharing devices 10 and 20 in response to page requests received from the data sharing devices 10 and 20. The server device 30 includes a communication interface 31, a CPU 32, a RAM 33, and a HDD 34. The above devices are connected via a bus in a manner capable of communicating with one another.

The communication interface 31 is an interface based on a protocol such as TCP/IP for communication with the data sharing devices 10 and 20, and the like via the network 1 such as a LAN. When the communication interface 31 is based on TCP/IP, for example, the communication interface 31 removes headers of TCP and IP from data received from the data sharing devices 10 and 20. When the communication interface 31 transmits or receives data to/from the data sharing devices 10 and 20, the communication interface 31 also adds or removes TCP and IP headers to/from the data. The communication interface 31 is constituted by a communication unit such as a network interface card (NIC), for example.

The CPU 32 controls overall operation of the server device 30.

The RAM 33 is a device to store various programs including server applications executed at the server device 30, data used for various processes carried out at the server device 30, and the like. The server applications are executed by the CPU 32 on an operating system (OS) expanded on the RAM 33.

The HDD 34 is an external storage device to accumulate and store the OS, programs, data, and the like. Note that the HDD 34 is not limited to a HDD that is an external storage device, but may be realized by a storage device such as a SSD, an optical disk, or a magneto-optical disk (MO), for example.

Figure 2:
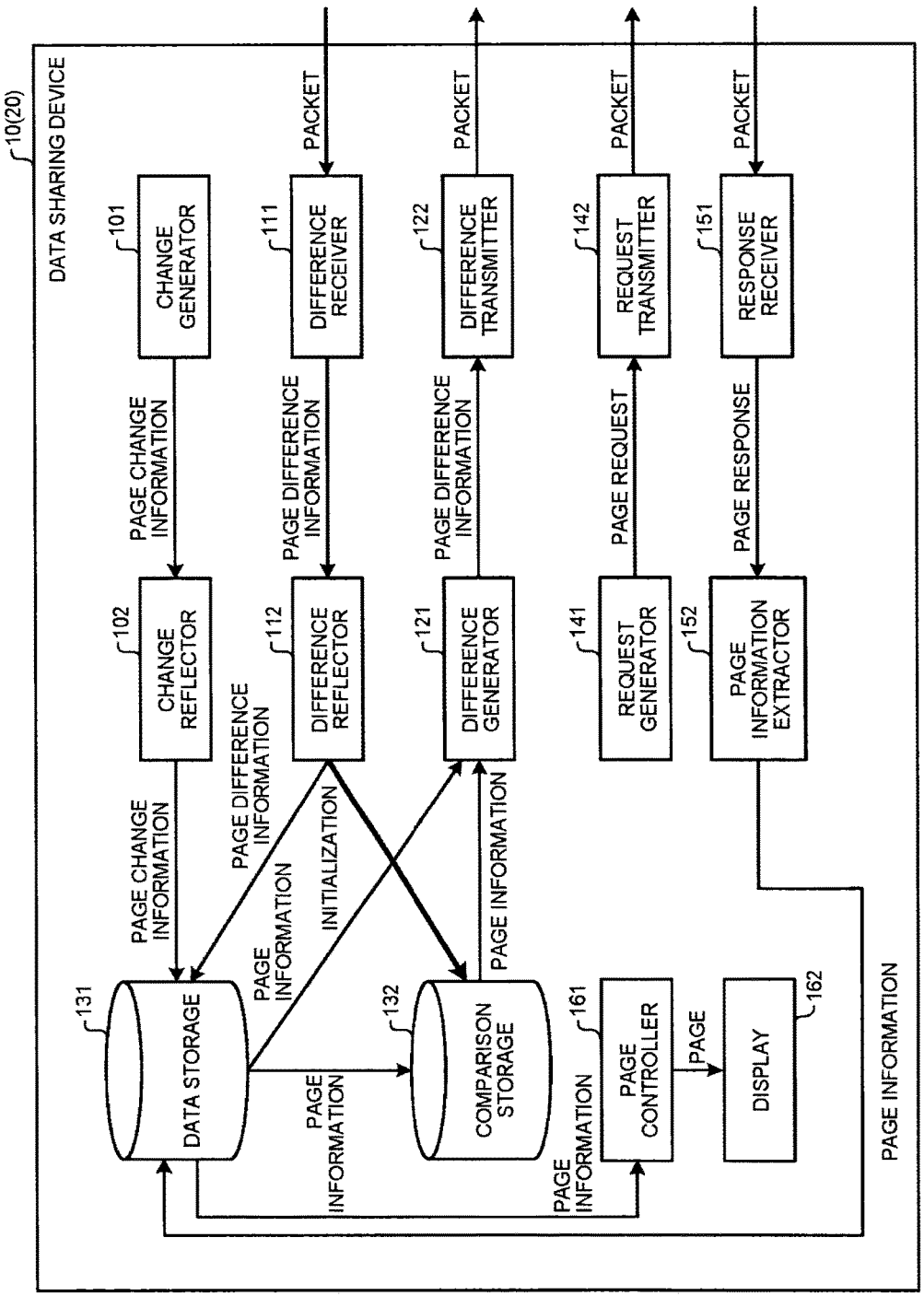
FIG. 2 is a diagram illustrating an example of a block configuration of a data sharing device according to the first embodiment.

FIG. 2 is a diagram illustrating an example of a block configuration of a data sharing device according to the first embodiment. The block configuration of the data sharing devices 10 and 20 will be described with reference to FIG. 2.

As illustrated in FIG. 2, the data sharing device 10 includes a change generator 101 (change generator), a change reflector 102 (change reflector), a difference receiver 111 (difference receiver), a difference reflector 112 (difference reflector), a difference generator 121 (difference generator), a difference transmitter 122 (difference transmitter), a data storage 131 (first storage), a comparison storage 132 (second storage), a request generator 141, a request transmitter 142, a response receiver 151, a page information extractor 152, a page controller 161, and a display 162.

The change generator 101 is a functional unit to generate page change information (change information) that is information indicating a change made on page information on which a page displayed on the display device 15 is based when the page information is changed by an operation of the input device 16 performed by the user, for example. The change generator 101 is implemented by a program executed by the CPU 12 illustrated in FIG. 1.

The change reflector 102 is a functional unit to reflect a change indicated by page change information received from the change generator 101 in page information (first information) which is stored in the data storage 131 and on which a page displayed on the display device 15 is based. The change reflector 102 is implemented by a program executed by the CPU 12 illustrated in FIG. 1.

The difference receiver 111 is a functional unit to receive a packet containing page difference information (second difference information) and header information added thereto from another data sharing device (the data sharing device 20, for example) via the network 1. Note that page difference information is information indicating a difference extracted by comparing two pieces of page information by the difference generator 121 as will be described later. The difference receiver 111 is realized by the communication interface 11 illustrated in FIG. 1.

The difference reflector 112 is a functional unit to initialize information (second information) stored in the comparison storage 132, and reflect a difference indicated by page difference information received from the difference reflector 111 in page information which is stored in the data storage 131 and on which a page displayed on the display device 15 is based. The difference reflector 112 is implemented by a program executed by the CPU 12 illustrated in FIG. 1.

The difference generator 121 is a functional unit to acquire page information in which a change is reflected from the data storage 131 when reflection of the change in the page information in the data storage 131 by the change reflector 102 is detected or reflection of the difference in the page information in the data storage 131 by the difference reflector 112 is detected, acquire page information (corresponding to initialized information) stored in the comparison storage 132, compare the two pieces of page information, and extract a difference therebetween as page difference information (first difference information). The difference generator 121 is implemented by a program executed by the CPU 12 illustrated in FIG. 1.

The difference transmitter 122 is a functional unit to transmit a packet containing page difference information received from the difference generator 121 and header information added thereto to another data sharing device (such as the data sharing device 20) via the network 1. The difference transmitter 122 is realized by the communication interface 11 illustrated in FIG. 1.

The data storage 131 is a functional unit to store page information of a web page displayed on the display device 15. The data storage 131 is realized by the RAM 13 illustrated in FIG. 1.

The comparison storage 132 is a functional unit to temporarily store page information stored in the data storage 131 in a state before being changed by page change information from the change reflector 102 or page difference information from the difference reflector 112. The comparison storage 132 is realized by the RAM 13 illustrated in FIG. 1.

The request generator 141 is a functional unit to generate a page request for requesting a web page that the user wants to view. The request generator 141 is implemented by a program executed by the CPU 12 illustrated in FIG. 1.

The request transmitter 142 is a functional unit to transmit a packet containing a page request and header information added thereto received from the request generator 141 to the server device 30 via the network 1. The request transmitter 142 is realized by the communication interface 11 illustrated in FIG. 1.

The response reflector 151 is a functional unit to receive a packet including a page response containing page information in HTML, XML, or the like and header information added thereto from the server device 30 via the network 1. The response reflector 151 is realized by the communication interface 11 illustrated in FIG. 1.

The page information extractor 152 is a functional unit to extract page information from a page response received from the response reflector 151. The page information extractor 152 is implemented by a program executed by the CPU 12 illustrated in FIG. 1.

The page controller 161 is a functional unit to convert page information acquired from the data storage 131 into a page in a format that can be displayed by the display 162. The page controller 161 is implemented by a program executed by the CPU 12 illustrated in FIG. 1.

The display 162 is a functional unit to display a page resulting from page conversion by the page controller 161. The display 162 is realized by the display device 15 illustrated in FIG. 1.

Note that the data sharing device 20 has the block configuration illustrated in FIG. 2 similarly to the data sharing device 10.

Furthermore, the change generator 101, the change reflector 102, the difference reflector 112, the difference generator 121, the request generator 141, the page information extractor 152, and the page controller 161 described above may be realized by hardware circuits instead of programs that are software.

Furthermore, the change generator 101, the change reflector 102, the difference reflector 111, the difference reflector 112, the difference generator 121, the difference transmitter 122, the data storage 131, the comparison storage 132, the request generator 141, the request transmitter 142, the response reflector 151, the page information extractor 152, the page controller 161, and the display 162 illustrated in FIG. 2 are conceptual representation of functions and are not limited to such a configuration.

Figure 3:
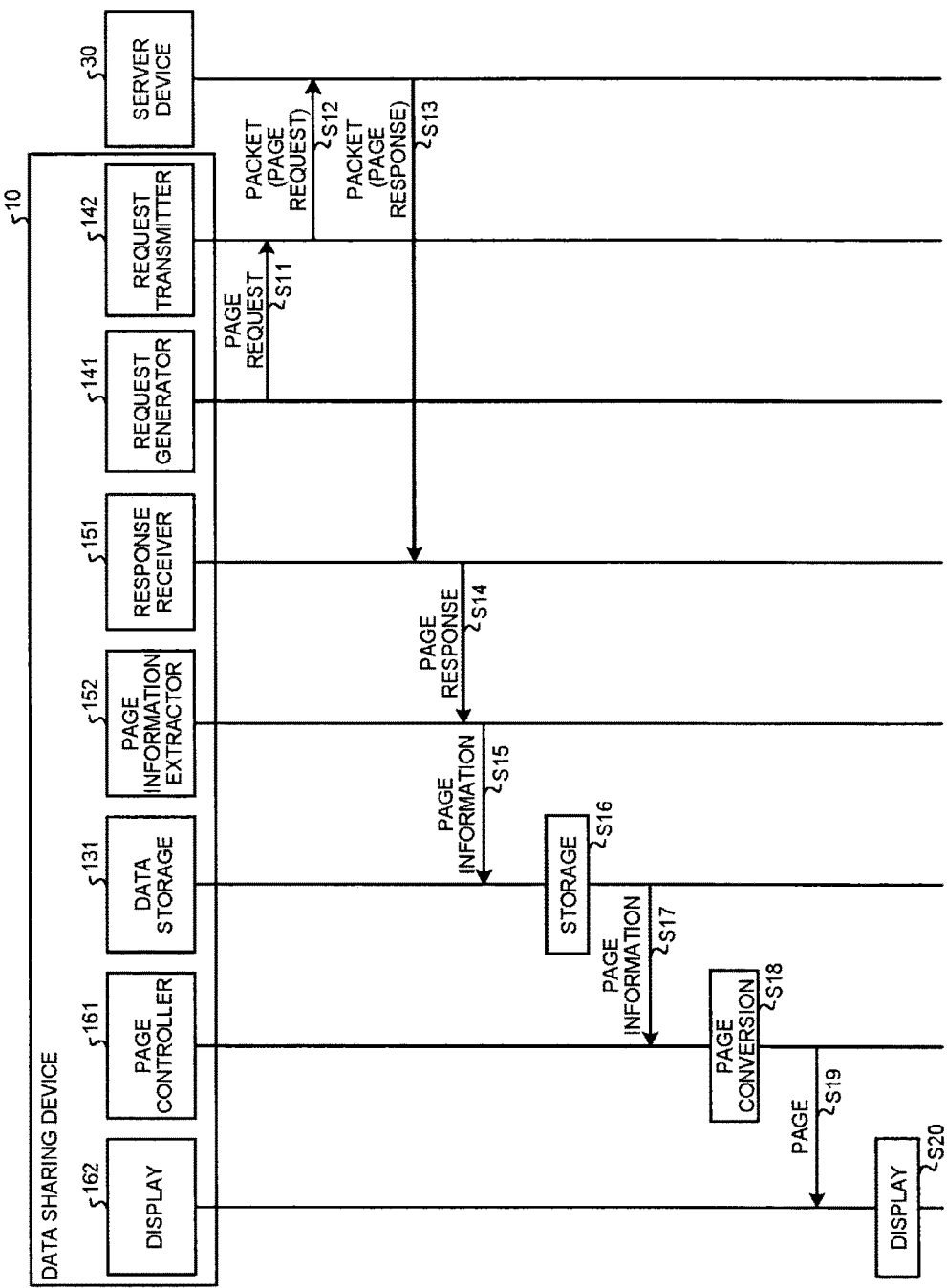
FIG. 3 is a sequence diagram of operation when a page response is received from a server device.

FIG. 3 is a sequence diagram of operation when a page response is received from the server device. With reference to FIG. 3, operation in which the data sharing device 10 transmits a page request to the server device 30 and receives a page response from the server device 30 will be described.

Step S11

The request generator 141 of the data sharing device 10 generates a page request for requesting a web page that the user wants to view, and sends the page request to the request transmitter 142 of the data sharing device 10.

Step S12

The request transmitter 142 transmits a packet including the received page request and header information added thereto to the server device 30 via the network 1.

Step S13

The server device 30 acquires the page requested by the data sharing device 10 from a storage such as the HDD 34 of the server device 30 on the basis for the page request obtained by removing the header information from the received packet. The server device 30 then transmits a packet containing a page response containing the acquired page information in HTML, XML or the like and header information added thereto to the response reflector 151 of the data sharing device 10 via the network 1.

Step S14

The response reflector 151 sends the page response obtained by removing the header information from the received packet to the page information extractor 152 of the data sharing device 10.

Step S15

The page information extractor 152 extracts the page information from the page response, and sends the page information to the data storage 131 of the data sharing device 10.

Step S16

The data storage 131 stores and accumulates the page information.

Step S17

The page controller 161 of the data sharing device 10 acquires the page information stored in the data storage 131.

Step S18

The page controller 161 converts the acquired page information into a page in a format that can be displayed by the display 162.

Step S19

The page controller 161 sends the information (hereinafter simply referred to as a page) resulting from the page conversion to the display 162 of the data sharing device 10.

Step S20

The display 162 displays the received page.

The data sharing device 10 then transfers the page information received by the server device 30 to the data sharing device 20 that is another data sharing device via the network 1. The data sharing device 20 converts the received page information into a page similarly to the data sharing device 10, and displays the page. Note that the data sharing device 20 may acquire page information from the server device 30 instead of the data sharing device 10.

Figure 4:
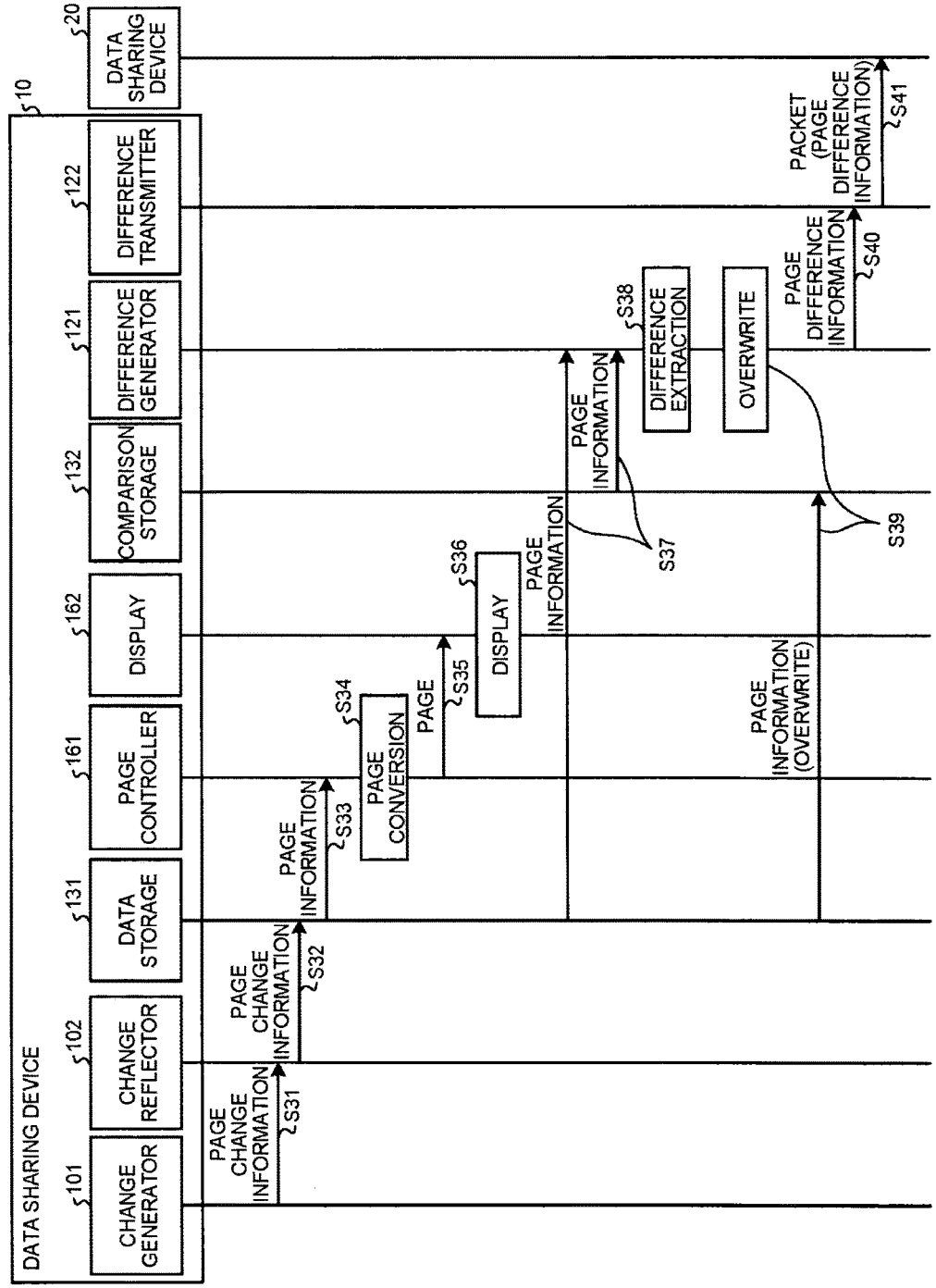
FIG. 4 is a sequence diagram of operation when a page is changed in a data sharing device.

FIG. 4 is a sequence diagram of operation when a page is changed in a data sharing device. With reference to FIG. 4, operation when page information of a web page is changed in the data sharing device 10 will be described.

Step S31

When page information on which a page displayed by the display 162 is based is changed by an operation of the input device 16 performed by the user, for example, the change generator 101 of the data sharing device 10 generates page change information that is information containing the change. Specifically, a change in page information refers to an input of a character on a browser displayed by the display 162, disabling or enabling of a button display, a change in the color or the size of a part displayed on a browser, or a change in metadata attached to a part, for example. The change generator 101 then sends the generated page change information to the change reflector 102 of the data sharing device 10.

Step S32

The change reflector 102 reflects the change indicated by the received page change information in the page information which is stored in the data storage 131 and on which the page displayed by the display 162 is based.

Step S33

The page controller 161 acquires the page information in which the change is reflected from the data storage 131.

Step S34

The page controller 161 converts the acquired page information into a page in a format that can be displayed by the display 162.

Step S35

The page controller 161 sends the page resulting from the page conversion to the display 162.

Step S36

The display 162 displays the received page.

Step S37

When the reflection of the change in the page information in the data storage 131 by the change reflector 102 in step S32 is detected, the difference generator 121 of the data sharing device 10 acquires the page information in which the change is reflected from the data storage 131. In addition to acquiring the page information from the data storage 131, the difference generator 121 also acquires the page information (corresponding to the page information before the reflection of the change in step S32) stored in the comparison storage 132. Note that the reflection of the change in the page information in the data storage 131 performed by the change reflector 102 in step S32 may be detected by a separate functional unit such as a detector and the difference generator 121 may be informed of the detection. In this case, upon receiving the information from the detector, the difference generator 121 may acquire the pieces of page information from the data storage 131 and the comparison storage 132.

Step S38

When the page information acquired from the comparison storage 132 is not initialized information, which will be described later, the difference generator 121 extracts a difference of the page information acquired from the data storage 131 from the page information acquired from the comparison storage 132 as page difference information.

Step S39

The difference generator 121 writes the page information acquired from the data storage 131 over the page information stored in the comparison storage 132.

Step S40

The difference generator 121 sends the extracted page difference information to the difference transmitter 122 of the data sharing device 10.

Step S41

The difference transmitter 122 transmits a packet containing the received page difference information and header information added thereto to another data sharing device (herein, the data sharing device 20) via the network 1.

As in the operation described above, when page information of a web page displayed by the display 162 is changed in the data sharing device 10, a difference from page information before being changed stored in the comparison storage 132 is extracted by the difference generator 121, and page difference information that is information on the difference is transmitted to another data sharing device (herein, the data sharing device 20). The data sharing device 20 in receipt of the page difference information reflects the difference indicated by the page difference information in the page information of the web page displayed by the display 162 of the data sharing device 20 and causes the display 162 to display a page based on the page information in which the difference is reflected according to the operation described later with reference to FIG. 5. As a result, the data sharing device 10 and the data sharing device 20 share the same page information, and can thus make the pages (web pages) displayed thereon to be the same.

Figure 5:
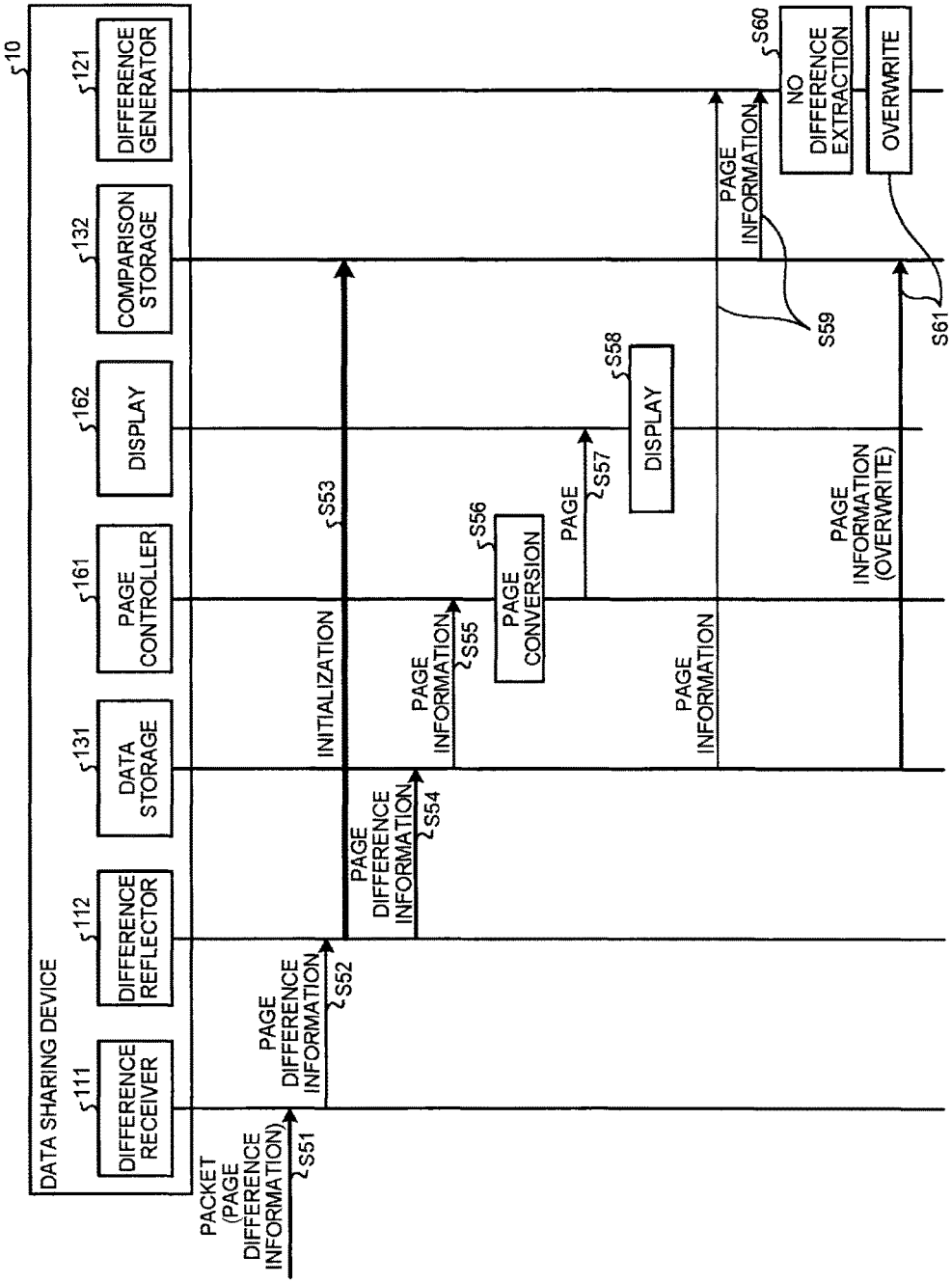
FIG. 5 is a sequence diagram of operation when page difference information is received from outside.

FIG. 5 is a sequence diagram of operation when page difference information is received from outside. With reference to FIG. 5, operation when the data sharing device 10 receives page difference information from outside (the data sharing device 20) will be described.

Step S51

The difference reflector 111 of the data sharing device 10 receives a packet containing page difference information from another data sharing device (the data sharing device 20, for example) via the network 1. Note that the difference contained in the page difference information refers to an input of a character on a browser displayed by the display 162, disabling or enabling of a button display, a change in the color or the size of a part displayed on a browser, or a change in metadata attached to apart, for example, similarly to the change in page information described above.

Step S52

The difference reflector 111 sends the page difference information obtained by removing header information from the received packet to the difference reflector 112 of the data sharing device 10.

Step S53

The difference reflector 112 initializes information stored in the comparison storage 132. The difference reflector 112 may perform the initialization by deleting page information stored in the comparison storage 132 or may perform the initialization by overwriting predetermined initialization information, for example. Hereinafter, the information in the comparison storage 132 resulting from the initialization by the difference reflector 112 will be referred to as initialized information.

Step S54

The difference reflector 112 reflects the difference indicated by the received page difference information in the page information which is stored in the data storage 131 and on which the page displayed by the display 162 is based.

Step S55

The page controller 161 acquires the page information in which the difference is reflected from the data storage 131.

Step S56

The page controller 161 converts the acquired page information into a page in a format that can be displayed by the display 162.

Step S57

The page controller 161 sends the page resulting from the page conversion to the display 162.

Step S58

The display 162 displays the received page.

Step S59

When the reflection of the difference in the page information in the data storage 131 by the difference reflector 112 in step S54 is detected, the difference generator 121 acquires the page information in which the difference is reflected from the data storage 131. In addition to acquiring the page information from the data storage 131, the difference generator 121 also acquires the page information (corresponding to the initialized information) stored in the comparison storage 132. Note that the reflection of the difference in the page information in the data storage 131 performed by the difference reflector 112 in step S54 may be detected by a separate functional unit such as a detector and the difference generator 121 may be informed of the detection. In this case, upon receiving the information from the detector, the difference generator 121 may acquire the pieces of page information from the data storage 131 and the comparison storage 132.

Step S60

Since the page information acquired from the comparison storage 132 is initialized information, the difference generator 121 determines that there is no difference in the page information acquired from the data storage 131. The difference generator 121 thus does not generate page difference information from the pieces of page information acquired from the data storage 131 and the comparison storage 132.

Step S61

The difference generator 121 writes the page information acquired from the data storage 131 over the initialized information stored in the comparison storage 132.

As in the operation described above, when the data sharing device 10 has received page difference information from outside (another data sharing device), the difference reflector 112 initializes the comparison storage 132 and reflects the difference indicated by the page difference information in the page information of the web page displayed by the display 162, and displays a page based on the page information in which the difference is reflected on the display 162. Furthermore, when the comparison storage 132 is initialized, the difference generator 121 determines that there is no difference in the page information acquired from the data storage 131, does not generate page difference information, and does not transmit page difference information to outside (another data sharing device). Specifically, since another data sharing device that has transmitted page difference information to the data sharing device 10 can be determined to already display the page based on the page information in which the difference indicated by the page difference information is reflected, the data sharing device 10 does not newly transmit the page difference information with the same content to the another data sharing device. As a result, occurrence of a loop in which the page difference information is transferred to the source data sharing device can be suppressed, and degradation in the performances of the data sharing devices 10 and 20 and the network 1 can be suppressed.

Modified Example of First Embodiment

Figure 6:
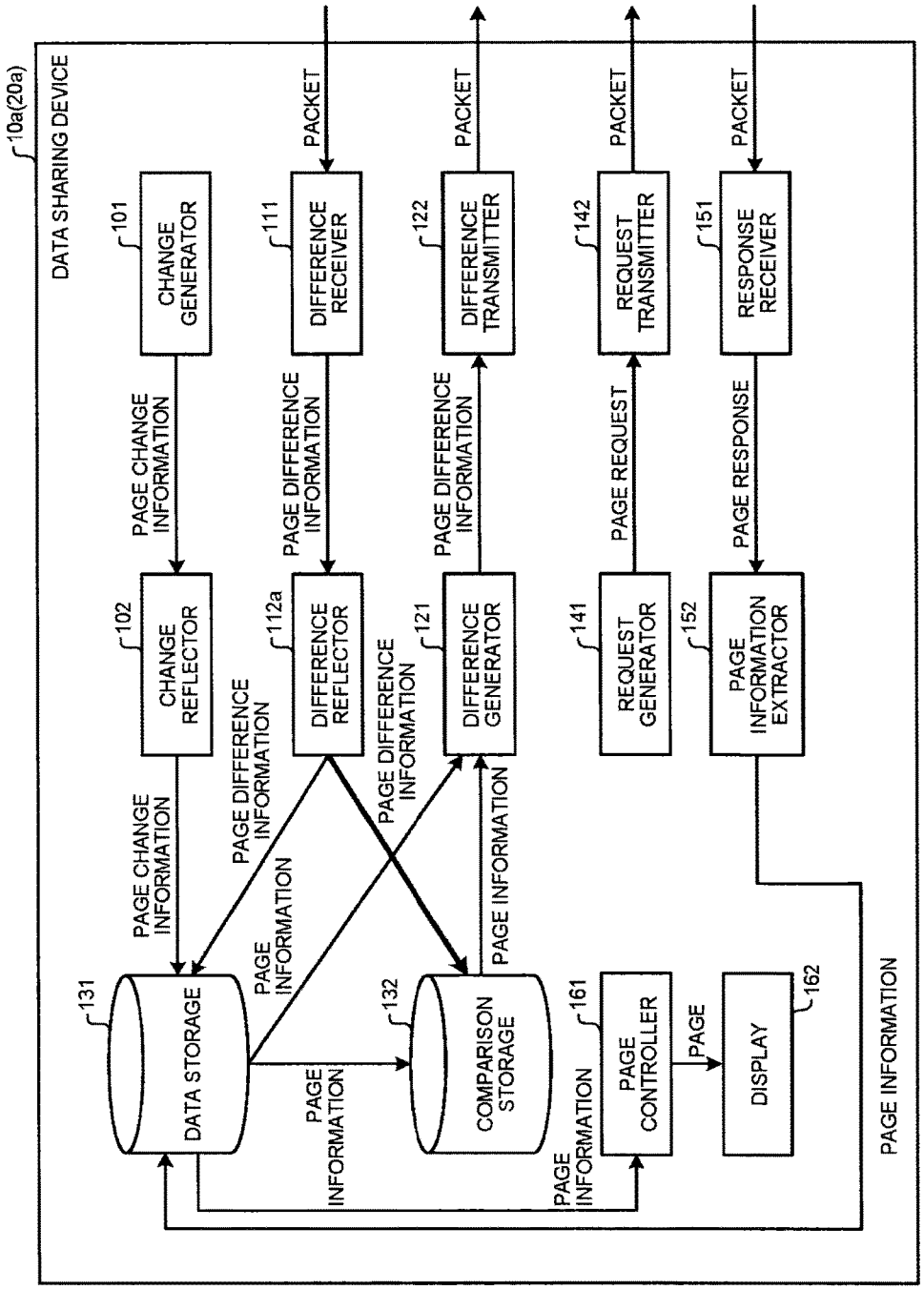
FIG. 6 is a diagram illustrating an example of a block configuration of a data sharing device according to a modified example.

FIG. 6 is a diagram illustrating an example of a block configuration of a data sharing device according to a modified example of the first embodiment. With reference to FIG. 6, configurations and operation of data sharing devices 10a and 20a according to the present modified example will be described mainly on the configurations and the operation different from the data sharing devices 10 and 20 according to the first embodiment. The data sharing devices 10a and 20a have the same hardware configurations as those of the data sharing devices 10 and 20, respectively, illustrated in FIG. 1.

As illustrated in FIG. 6, the block configuration of the data sharing device 10a is a configuration corresponding to the block configuration of the data sharing device 10 illustrated in FIG. 2 but the difference reflector 112 therein is replaced by a difference reflector 112a (difference reflector). The difference reflector 112a is a functional unit to reflect a difference indicated by page difference information received from the difference reflector 111 in page information which is stored in the data storage 131 and on which a page displayed by the display device 15 is based. Furthermore, the difference reflector 112a also reflects the difference indicated by the page difference information received from the difference reflector 111 in page information stored in the comparison storage 132 in addition to the page information stored in the data storage 131. The difference reflector 112a is implemented by a program executed by the CPU 12 illustrated in FIG. 1.

Note that the data sharing device 20a also has the block configuration illustrated in FIG. 6 similarly to the data sharing device 10a.

Next, operation when page difference information is received from outside (the data sharing device 20a) of the data sharing device 10a will be described mainly on the difference from the operation of the data sharing device 10 illustrated in FIG. 5. Note that steps S51, S52, and S54 to S58 are the same as those in the operation of the data sharing device 10 according to the first embodiment.

Step S53

The difference reflector 112a reflects a difference indicated by the received page difference information in the page information stored in the comparison storage 132.

Step S59

When the reflection of the difference in the page information in the data storage 131 by the difference reflector 112 in step S54 is detected, the difference generator 121 acquires the page information in which the difference is reflected from the data storage 131. In addition to acquiring the page information from the data storage 131, the difference generator 121 also acquires the page information in which the difference is reflected stored in the comparison storage 132. Note that the reflection of the difference in the page information in the data storage 131 performed by the difference reflector 112 in step S54 may be detected by a separate functional unit such as a detector and the difference generator 121 may be informed of the detection. In this case, upon receiving the information from the detector, the difference generator 121 may acquire the pieces of page information from the data storage 131 and the comparison storage 132.

Step S60

The difference generator 121 compares the page information acquired from the data storage 131 with the page information acquired from the comparison storage 132. As in processes of step S61, which will be described later, and step S39 in the sequence diagram illustrated in FIG. 4, the page information stored in the data storage 131 is already written over the page information stored in the comparison storage 132. Furthermore, in steps S53 and S54, the difference of the same page difference information is reflected in the pieces of page information stored in the data storage 131 and the comparison storage 132 by the difference reflector 112. Thus, the difference generator 121 determines here that the page information acquired from the data storage 131 has no difference from the page information acquired from comparison storage 132. The difference generator 121 thus does not generate page difference information from the pieces of page information acquired from the data storage 131 and the comparison storage 132.

Step S61

The difference generator 121 writes the page information acquired from the data storage 131 over the page information stored in the comparison storage 132. As described above, since the page information stored in the data storage 131 and the page information stored in the comparison storage 132 are the same, overwriting is not necessarily needed.

As described above, the difference reflector 112a reflects the difference in the page information in the comparison storage 132 by the page difference information by which the difference is reflected in the page information in the data storage 131 instead of initializing the comparison storage 132. As a result, since the difference generator 121 determines that the page information acquired from the data storage 131 has no difference from the page information acquired from the comparison storage 132, the difference generator 121 does not transmit the page difference information to the outside (another data sharing device). As a result, similarly to the first embodiment, occurrence of a loop in which the page difference information is transferred to the source data sharing device can be suppressed, and degradation in the performances of the data sharing devices 10a and 20a and the network 1 can be suppressed. Furthermore, the difference generator 121 need not be configured to determine that there is no difference in the page information acquired from the data storage 131 when the page information acquired from the comparison storage 132 is initialized information as in the first embodiment. Thus, the difference generator 121 may determine whether or not there is a difference through a normal comparison operation, which can simplify the implementation of processes.

Second Embodiment

A data sharing system 500b and data sharing devices 10b and 20b according to the present embodiment will be described mainly on the configuration and operation different from those of the data sharing system 500 and the data sharing devices 10 and 20 according to the first embodiment.

Figure 7:
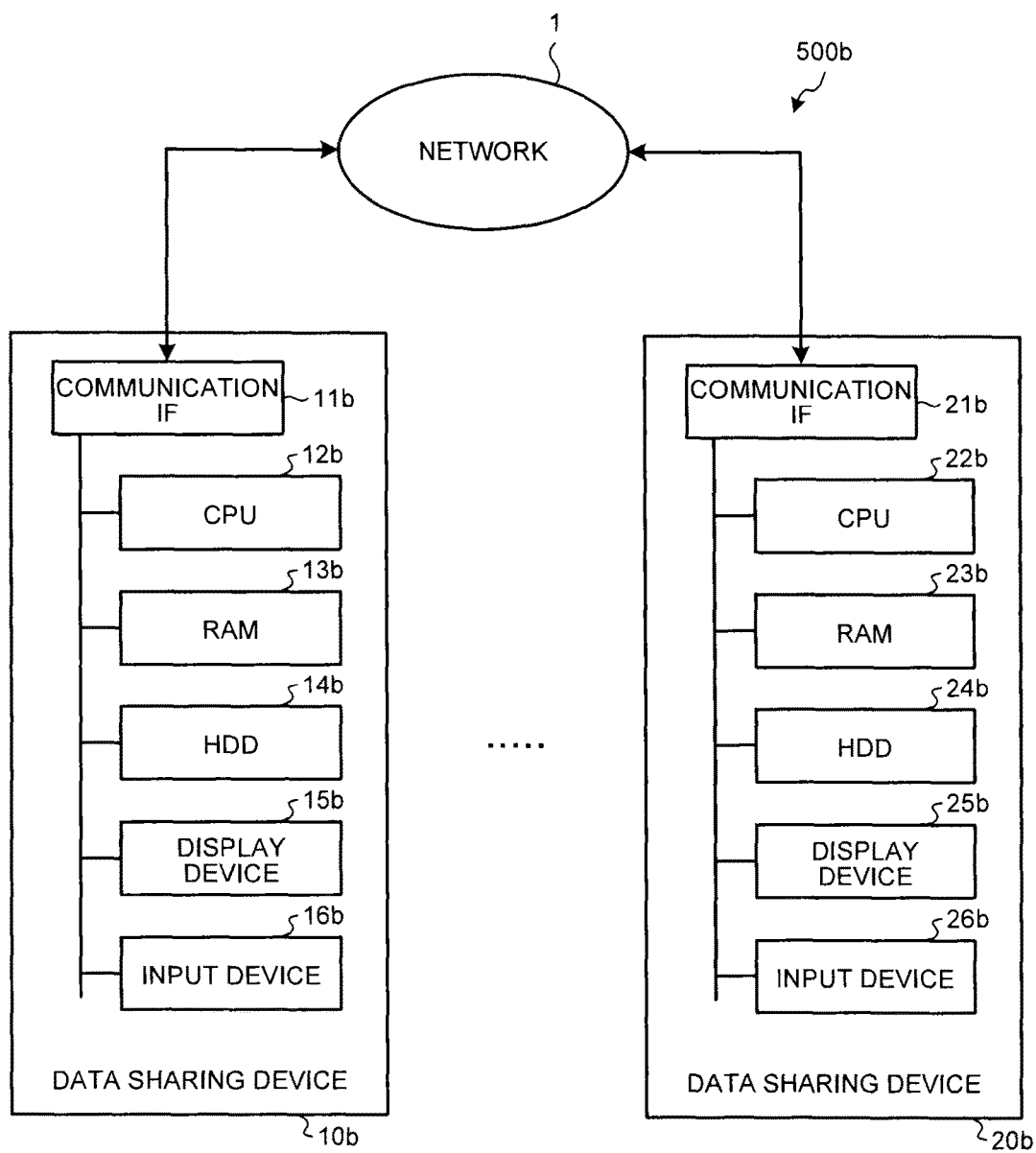
FIG. 7 is a diagram illustrating an example of an overall configuration of a data sharing system according to a second embodiment.

FIG. 7 is a diagram illustrating an example of an overall configuration of a data sharing system according to the second embodiment. With reference to FIG. 7, the overall configuration of the data sharing system 500b and hardware configurations of data sharing devices 10a, 20a will be described.

As illustrated in FIG. 7, the data sharing system 500b includes the data sharing device 10b and the data sharing device 20b. The data sharing device 10b and the data sharing device 20b are connected via a network 1.

Although two data sharing devices 10b and 20b are illustrated as the data sharing devices connected via the network 1 in FIG. 7, the number of data sharing devices is not limited thereto, and three or more data sharing devices may be connected.

The data sharing device 10b is a device to transfer information containing a change in an image displayed on a display thereof to another data sharing device (the data sharing device 20b in FIG. 7) when such a change is caused. The data sharing device 10b includes a communication interface 11b, a CPU 12b, a RAM 13b, a HDD 14b, a display device 15b, and an input device 16b. The above devices are connected via a bus in a manner capable of communicating with one another.

The communication interface 11b is an interface based on a protocol such as TCP/IP for communication with the data sharing device 20b via the network 1 such as a LAN. When the communication interface 11b transmits or receives data to/from the data sharing device 20b, for example, the communication interface 11b adds or removes TCP and IP headers to/from the data. The communication interface 11b is constituted by a communication unit such as an NIC, for example.

The CPU 12b controls overall operation of the data sharing device 10b.

The RAM 13b is a device to store various programs including screen transfer applications and other graphical user interface (GUI) applications executed at the data sharing device 10b, data used for various processes carried out at the data sharing device 10b, and the like. The screen transfer applications and the like are executed by the CPU 12b on an OS expanded on the RAM 13b.

The HDD 14b is an external storage device to accumulate and store the OS, programs, data, and the like. Note that the HDD 14b is not limited to a HDD that is an external storage device, but may be realized by a storage device such as a SSD, an optical disk, or a magneto-optical disk (MO), for example.

The display device 15b is a device to display various images generated by the screen transfer applications or GUI applications. The display device 15b is constituted by a CRT display, a liquid crystal display, a plasma display, an organic EL display, or the like, for example.

The input device 16b is a device to which operations are input by a user for causing the CPU 12b to execute predetermined processes. The input device 16b is constituted by operation input functions such as a mouse, a keyboard, a numeric key pad, a touch pad, or a touch panel.

The data sharing device 20b is a device having the same functions as the data sharing device 10b. The data sharing device 20b includes a communication interface 21b, a CPU 22b, a RAM 23b, a HDD 24b, a display device 25b, and an input device 26b. The above devices are connected via a bus in a manner capable of communicating with one another. The communication interface 21b, the CPU 22b, the RAM 23b, the HDD 24b, the display device 25b, and the input device 26b have the same functions as those of the communication interface 11b, the CPU 12b, the RAM 13b, the HDD 14b, the display device 15b, and the input device 16b, respectively, of the data sharing device 10b.

Figure 8:
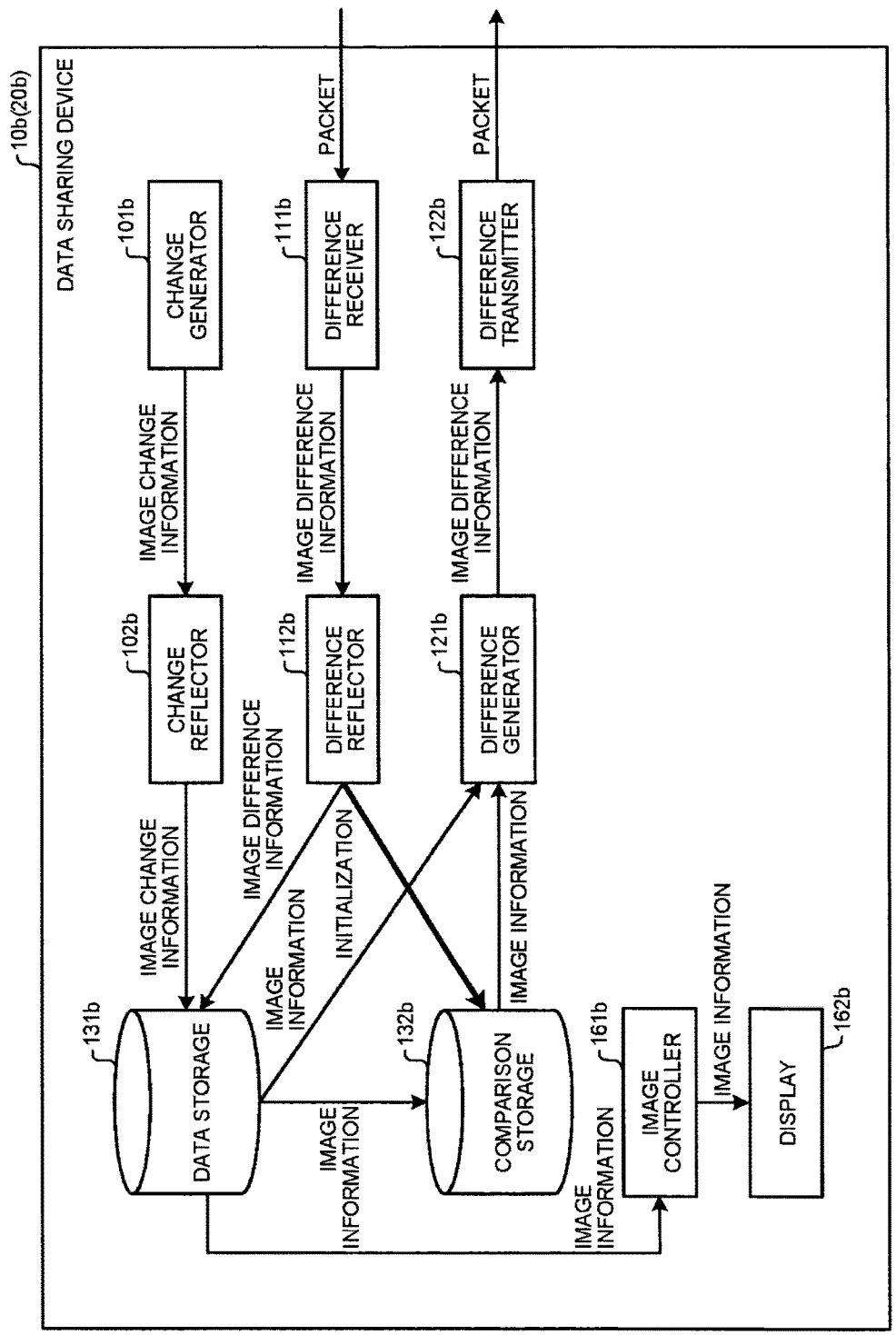
FIG. 8 is a diagram illustrating an example of a block configuration of a data sharing device according to the second embodiment.

FIG. 8 is a diagram illustrating an example of a block configuration of a data sharing device according to the second embodiment. With reference to FIG. 8, the block configuration of the data sharing devices 10b and 20b will be described.

As illustrated in FIG. 8, the data sharing device 10b includes a change generator 101b (change generator), a change reflector 102b (change reflector), a difference reflector 111b (difference receiver), a difference reflector 112b (difference reflector), a difference generator 121b (difference generator), a difference transmitter 122b (difference transmitter), a data storage 131b (first storage), a comparison storage 132b (second storage), an image controller 161b, and a display 162b.

The change generator 101b is a functional unit to generate image change information (change information) that is information indicating a change made on image information on which an image displayed on the display device 15b is based when the image information is changed by an operation of the input device 16b performed by the user, for example. The change generator 101b is implemented by a program executed by the CPU 12b illustrated in FIG. 7.

The change reflector 102b is a functional unit to reflect a change indicated by image change information received from the change generator 101b in image information (first information) which is stored in the data storage 131b and on which an image displayed on the display device 15b is based. The change reflector 102b is implemented by a program executed by the CPU 12b illustrated in FIG. 7.

The difference reflector 111b is a functional unit to receive a packet containing image difference information (second difference information) and header information added thereto from another data sharing device (the data sharing device 20b, for example) via the network 1. Note that image difference information is information indicating a difference extracted by comparing two pieces of image information by the difference generator 121b as will be described later. The difference reflector 111b is realized by the communication interface 11b illustrated in FIG. 7.

The difference reflector 112b is a functional unit to initialize information (second information) stored in the comparison storage 132b, and reflect a difference indicated by image difference information received from the difference reflector 111b in image information which is stored in the data storage 131b and on which an image displayed on the display device 15b is based. The difference reflector 112b is implemented by a program executed by the CPU 12b illustrated in FIG. 7.

The difference generator 121b is a functional unit to acquire image information in which a change is reflected from the data storage 131b when reflection of the change in image information in the data storage 131b by the change reflector 102b or reflection of the difference in image information in the data storage 131b by the difference reflector 112b is detected, acquire image information (corresponding to initialized information) stored in the comparison storage 132b, compare the two pieces of image information, and extract a difference therebetween as image difference information (first difference information). The difference generator 121b is implemented by a program executed by the CPU 12b illustrated in FIG. 7.

The difference transmitter 122b is a functional unit to transmit a packet containing image difference information received from the difference generator 121b and header information added thereto to another data sharing device (the data sharing device 20b) via the network 1. The difference transmitter 122b is realized by the communication interface 11b illustrated in FIG. 7.

The data storage 131b is a functional unit to store image information of an image displayed on the display device 15b. The data storage 131b is realized by the RAM 13b illustrated in FIG. 7.

The comparison storage 132b is a functional unit to temporarily store image information stored in the data storage 131b in a state before being changed by image change information from the change reflector 102b or image difference information from the difference reflector 112b. The comparison storage 132b is realized by the RAM 13b illustrated in FIG. 7.

The image controller 161b is a functional unit to send image information acquired from the data storage 131b to the display 162. The image controller 161b is implemented by a program executed by the CPU 12b illustrated in FIG. 7.

The display 162b is a functional unit to display an image based on image information received from the image controller 161b. The display 162b is realized by the display device 15b illustrated in FIG. 7.

Note that the data storage 131b and the comparison storage 132b may be realized by storage devices such as frame buffers different from the RAM 13b.

Furthermore, the data sharing device 20b also has the block configuration illustrated in FIG. 8 similarly to the data sharing device 10b.

Furthermore, the change generator 101b, the change reflector 102b, the difference reflector 112b, the difference generator 121b, and the image controller 161b described above may be realized by hardware circuits instead of programs that are software.

Furthermore, the change generator 101b, the change reflector 102b, the difference reflector 111b, the difference reflector 112b, the difference generator 121b, the difference transmitter 122b, the data storage 131b, the comparison storage 132b, the image controller 161b, and the display 162b illustrated in FIG. 8 are conceptual representation of functions and are not limited to such a configuration.

Figure 9:
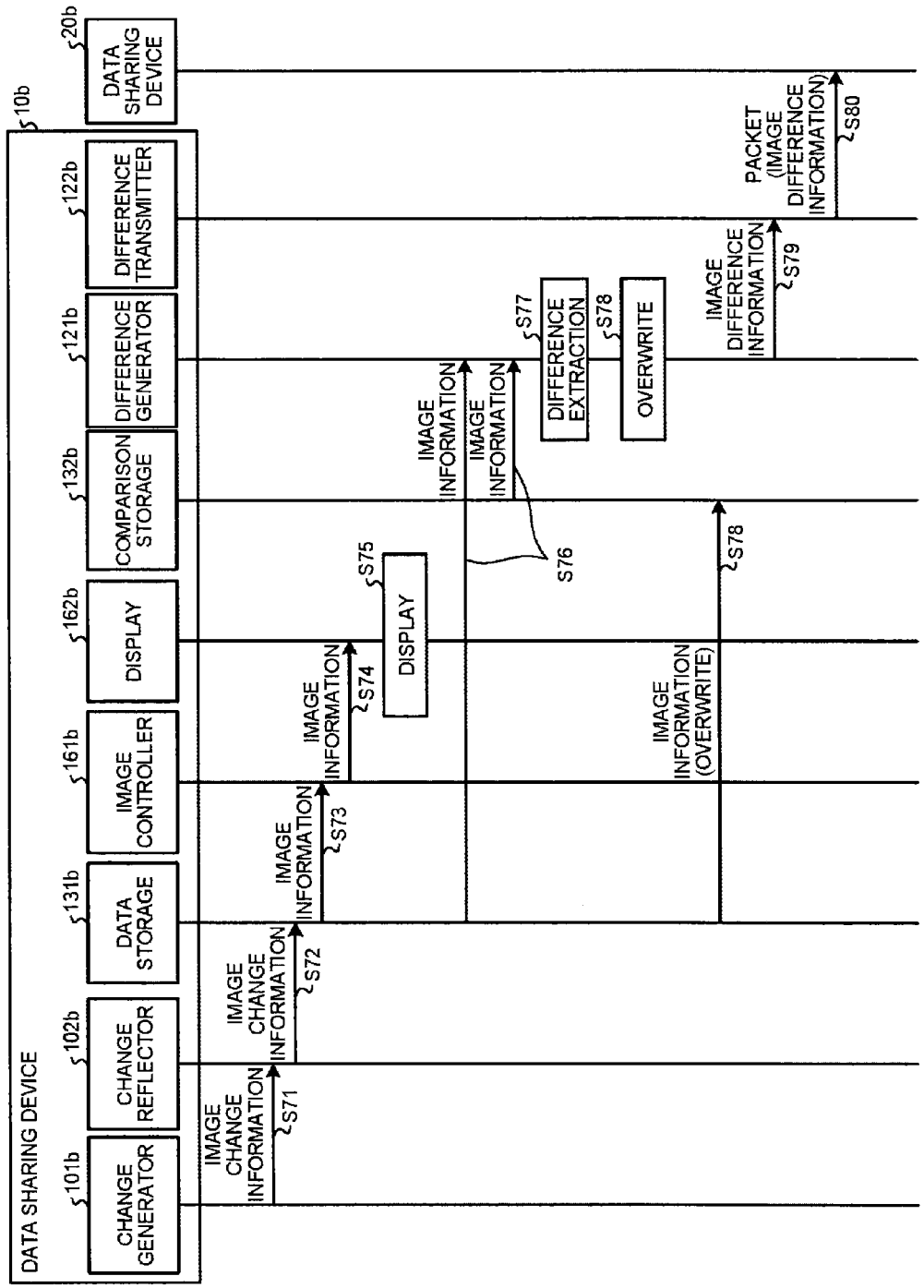
FIG. 9 is a sequence diagram of operation when a screen is changed in a data sharing device.

FIG. 9 is a sequence diagram of operation when a screen is changed in a data sharing device. With reference to FIG. 9, operation when image information of a displayed image is changed in the data sharing device 10b will be described.

Step S71

When image information on which an image displayed by the display 162b is based is changed by an operation of the input device 16b performed by the user, for example, the change generator 101b of the data sharing device 10b generates image change information that is information containing the change. Specifically, a change in image information refers to a change in display on a window displayed by the display 162b such as an input of a character on an image displayed by the display 162b, or disabling or enabling of a button display, for example. The change generator 101b then sends the generated image change information to the change reflector 102b of the data sharing device 10b.

Step S72

The change reflector 102b reflects the change indicated by the received image change information in the image information which is stored in the data storage 131b and on which the image displayed by the display 162b is based.

Step S73

The image controller 161b of the data sharing device 10b acquires the image information in which the change is reflected from the data storage 131b.

Step S74

The image controller 161b sends the image information to the display 162b.

Step S75

The display 162b displays an image on the basis of the received image information.

Step S76

When the reflection of the change in the image information in the data storage 131b by the change reflector 102b in step S72 is detected, the difference generator 121b of the data sharing device 10b acquires the image information in which the change is reflected from the data storage 131b. In addition to acquiring the image information from the data storage 131b, the difference generator 121b also acquires the image information (corresponding to the image information before the reflection of the change in step S72) stored in the comparison storage 132b. Note that the reflection of the change in the image information in the data storage 131b performed by the change reflector 102b in step S72 may be detected by a separate functional unit such as a detector and the difference generator 121b may be informed of the detection. In this case, upon receiving the information from the detector, the difference generator 121b may acquire the pieces of image information from the data storage 131b and the comparison storage 132b.

Step S77

When the image information acquired from the comparison storage 132b is not initialized information, which will be described later, the difference generator 121b extracts a difference of the image information acquired from the data storage 131b from the image information acquired from the comparison storage 132b as image difference information.

Step S78

The difference generator 121b writes the image information acquired from the data storage 131b over the image information stored in the comparison storage 132b.

Step S79

The difference generator 121b sends the extracted image difference information to the difference transmitter 122b of the data sharing device 10b.

Step S80

The difference transmitter 122b transmits a packet containing the received image difference information and header information added thereto to another data sharing device (herein, the data sharing device 20b) via the network 1.

As in the operation described above, when image information of an image displayed by the display 162b is changed in the data sharing device 10b, a difference from image information before being changed stored in the comparison storage 132b is extracted by the difference generator 121b, and image difference information that is information on the difference is transmitted to another data sharing device (herein, the data sharing device 20b). The data sharing device 20b in receipt of the image difference information reflects the difference indicated by the image difference information in the image information of the image displayed by the display 162b of the data sharing device 20b and causes the display 162b to display an image based on the image information in which the difference is reflected according to the operation described later with reference to FIG. 10. As a result, the data sharing device 10b and the data sharing device 20b share the same image information, and can thus make the images displayed thereon to be the same.

Figure 10:
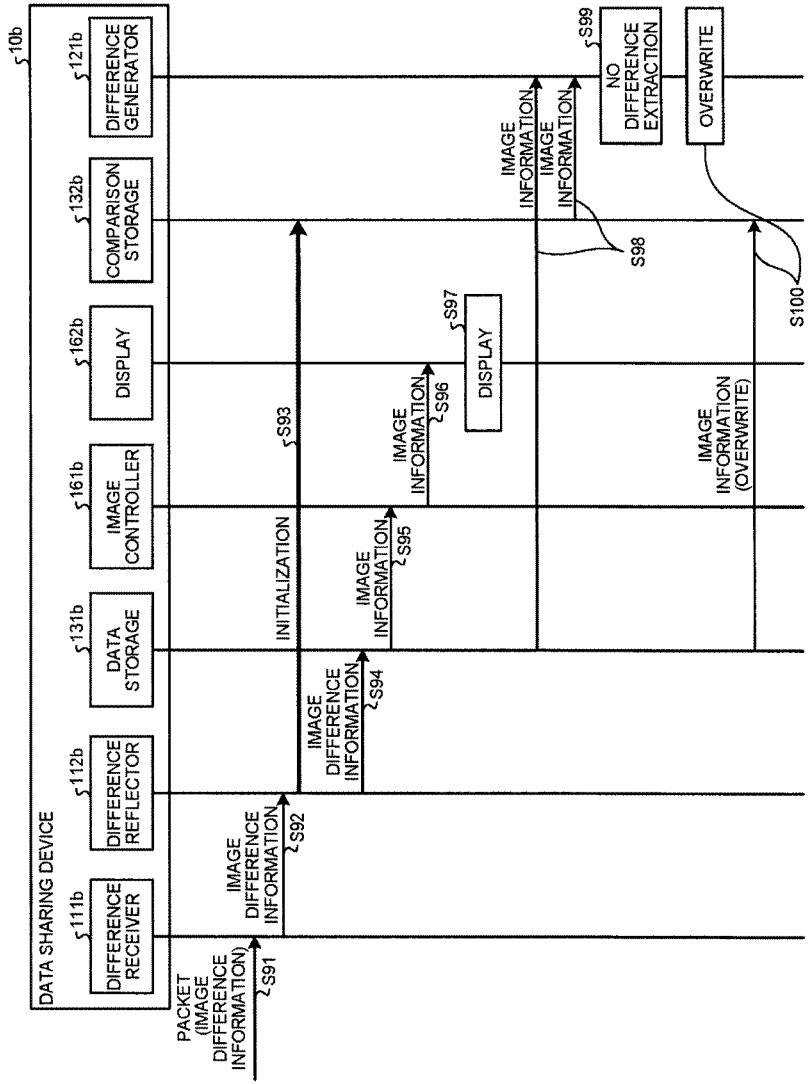
FIG. 10 is a sequence diagram of operation when image difference information is received from outside.

FIG. 10 is a sequence diagram of operation when image difference information is received from outside. With reference to FIG. 10, operation when the data sharing device 10b receives image difference information from outside (the data sharing device 20b) will be described.

Step S91

The difference reflector 111b of the data sharing device 10b receives a packet containing page difference information from another data sharing device (the data sharing device 20b, for example) via the network 1. Note that a difference contained in the image difference information refers to a change in display on a window displayed by the display 162b such as an input of a character on an image displayed by the display 162b, or disabling or enabling of a button display, for example, similarly to the change in image information described above.

Step S92

The difference reflector 111b sends the image difference information obtained by removing header information from the received packet to the difference reflector 112b of the data sharing device 10b.

Step S93

The difference reflector 112b initializes information stored in the comparison storage 132b. The difference reflector 112b may perform the initialization by deleting image information stored in the comparison storage 132b or may perform the initialization by overwriting predetermined initialization information, for example. Hereinafter, the information in the comparison storage 132b resulting from the initialization by the difference reflector 112b will be referred to as initialized information.

Step S94

The difference reflector 112b reflects the difference indicated by the received image difference information in the image information which is stored in the data storage 131b and on which the image displayed by the display 162b is based.

Step S95

The image controller 161b acquires the image information in which the difference is reflected from the data storage 131b.

Step S96

The image controller 161b sends the image information to the display 162b.

Step S97

The display 162b displays an image on the basis of the received image information.

Step S98

When the reflection of the difference in the image information in the data storage 131b by the difference reflector 112b in step S94 is detected, the difference generator 121b acquires the image information in which the difference is reflected from the data storage 131b. In addition to acquiring the image information from the data storage 131b, the difference generator 121b also acquires the image information (corresponding to the initialized information) stored in the comparison storage 132b. Note that the reflection of the difference in the image information in the data storage 131b performed by the difference reflector 112b in step S94 may be detected by a separate functional unit such as a detector and the difference generator 121b may be informed of the detection. In this case, upon receiving the information from the detector, the difference generator 121b may acquire the pieces of image information from the data storage 131b and the comparison storage 132b.

Step S99

Since the image information acquired from the comparison storage 132b is initialized information, the difference generator 121b determines that there is no difference in the image information acquired from the data storage 131b. The difference generator 121b thus does not generate image difference information from the pieces of image information acquired from the data storage 131b and the comparison storage 132b.

Step S100

The difference generator 121b writes the image information acquired from the data storage 131b over the initialized information stored in the comparison storage 132b.

As in the operation described above, when the data sharing device 10b has received image difference information from outside (another data sharing device), the difference reflector 112b initializes the comparison storage 132b and reflects the difference indicated by the image difference information in the image information of the image displayed by the display 162b, and displays an image based on the image information in which the difference is reflected on the display 162b. Furthermore, when the comparison storage 132b is initialized, the difference generator 121b determines that there is no difference in the image information acquired from the data storage 131b, does not generate image difference information, and does not transmit image difference information to outside (another data sharing device). Specifically, since another data sharing device that has transmitted image difference information to the data sharing device 10b can be determined to already display the image based on the image information in which the difference indicated by the image difference information is reflected, the data sharing device 10b does not newly transmit the image difference information with the same content to the another data sharing device. As a result, occurrence of a loop in which the image difference information is transferred to the source data sharing device can be suppressed, and degradation in the performances of the data sharing devices 10b and 20b and the network 1 can be suppressed.

Similarly to the data sharing devices 10a and 20a according to the modified example of the first embodiment, note that the difference reflector 112b may reflect the difference indicated by the same image difference information in the pieces of image information stored in the data storage 131b and the comparison storage 132b instead of initializing the comparison storage 132b. As a result, occurrence of a loop in which the image difference information is transferred to the source data sharing device can be suppressed, and degradation in the performances of the data sharing devices 10b and 20b and the network 1 can be suppressed. Furthermore, the difference generator 121b need not be configured to determine that there is no difference in the image information acquired from the data storage 131b when the image information acquired from the comparison storage 132b is initialized information as in the second embodiment. Thus, the difference generator 121b may determine whether or not there is a difference through a normal comparison operation, which can simplify the implementation of processes.

Although information displayed as an image on displays such as the page information in the first embodiment and the image information in the second embodiment is shared among multiple data sharing devices, shared information is not limited to displayed information. Thus, information that is not particularly intended to be displayed (such as data files or databases, for example) may be shared among multiple data sharing devices through the operations described above.

Programs to be executed by the CPU 12 of the data sharing device 10 (20) and the CPU 12b of the data sharing device 10b (20b) in the embodiments described above are recorded on a computer readable recording medium such as a CD-ROM, a CD-R, a memory card, a digital versatile disk (DVD) or a flexible disk (FD) in a form of a file that can be installed or executed, and provided therefrom.

Alternatively, the programs to be executed by the CPU 12 of the data sharing device 10 (20) and the CPU 12b of the data sharing device 10b (20b) in the embodiments described above may be stored on a computer system connected to a network such as the Internet, and provided by being downloaded via the network. Still alternatively, the programs to be executed by the CPU 12 of the data sharing device 10 (20) and the CPU 12b of the data sharing device 10b (20b) in the embodiments described above may be provided or distributed through a network such as the Internet. Still alternatively, the programs to be executed by the CPU 12 of the data sharing device 10 (20) and the CPU 12b of the data sharing device 10b (20b) in the embodiments described above may be embedded in a ROM or the like in advance and provided therefrom.

The programs to be executed by the CPU 12 of the data sharing device 10 (20) and the CPU 12b of the data sharing device 10b (20b) in the embodiments described above have modular structures for implementing the functions to be executed by the CPU 12 and the CPU 12b described above on a computer system. In an actual hardware configuration, the CPU 12, 12b reads programs from a storage device (the RAM 13, 13b) and executes the programs thereon, whereby the respective functions described above are implemented on a computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data sharing device comprising:
   a first storage to store first information;
   a second storage to store second information that is a copy of the first information stored in the first storage;
   a processor for executing instructions stored in a memory, the instructions comprising:
   a difference generating instruction to
      compare, when the first information stored in the first storage is changed, the changed first information with the second information stored in the second storage, extract, if there is a difference between the changed first information and the second information, the difference, and
      generate first difference information indicating the difference;
   a difference transmitting instruction to transmit the first difference information to an external data sharing device;
   a difference receiving instruction to receive second difference information generated in the external data sharing device or another external data sharing device; and
   a difference reflecting instruction to reflect a difference indicated by the second difference information in the first information stored in the first storage, and cause the first difference generating instruction not to generate the first difference information when the difference indicated by the second difference information is reflected.

2. The device according to claim 1, wherein when the second information stored in the second storage is initialized, the difference generating instruction does not generate the first difference information, and the difference reflecting instruction initializes the second information stored in the second storage before reflecting the difference indicated by the second difference information in the first information stored in the first storage.

3. The device according to claim 1, wherein the difference reflecting instruction reflects the difference indicated by the second difference information in the first information stored in the first storage and the second information stored in the second storage.

4. The device according to claim 1, further comprising:
a change generating instruction to generate change information indicating a change made in the first information stored in the first storage;
and a change reflecting instruction to reflect the change indicated by the change information in the first information stored in the first storage.

5. The device according to claim 1, wherein when the difference generating instruction compares the changed first information with the second information, the difference generating instruction writes the changed first information over the second information stored in the second storage.

6. The device according to claim 1, wherein the first information and the second information are page information of a web page.

7. The device according to claim 1, wherein the first information and the second information are image information of a displayed image.

8. A data sharing method for multiple data sharing devices that share information, the method comprising:
generating including comparing, when first information stored in a first storage is changed, the changed first information with second information stored in a second storage, the second information being a copy of the first information, extracting, if there is a difference between the changed first information and the second information, the difference, and generating first difference information indicating the difference;
transmitting the first difference information to an external data sharing device;
receiving second difference information generated in the external data sharing device or another external data sharing device; and
reflecting including reflecting a difference indicated by the second difference information in the first information stored in the first storage, and
causing the first difference information not to be generated when the difference indicated by the second difference information is reflected.

9. A non-transitory computer-readable medium containing computer-readable instructions, the instructions which when executed by a computer including a first storage to store first information, and a second storage to store second information that is a copy of the first information stored in the first storage, causing the computer to perform a method of:
transmitting first difference information to an external device;
receiving second difference information generated in the external device or another external data sharing device;
comparing, when the first information stored in the first storage is changed, the changed first information with the second information stored in the second storage;
extracting, if there is a difference between the changed first information and the second information, the difference; and
generating the first difference information indicating the difference; and
reflecting a difference indicated by the second difference information in the first information stored in the first storage, and causing the computer not to generate the first difference information when the difference indicated by the second difference information is reflected.

* * * * *